(12) United States Patent
Rizzo

(10) Patent No.: US 7,445,346 B2
(45) Date of Patent: Nov. 4, 2008

(54) PROJECTION EQUIPMENT SUPPORT SYSTEM

(75) Inventor: Anthony Joseph Rizzo, Plano, TX (US)

(73) Assignee: AR Metal Fabrication LLC, Plano, TX (US)

( * ) Notice: Subject to any disclaimer, the term of this patent is extended or adjusted under 35 U.S.C. 154(b) by 426 days.

(21) Appl. No.: 11/289,178

(22) Filed: Nov. 29, 2005

(65) Prior Publication Data

US 2006/0061738 A1    Mar. 23, 2006

(51) Int. Cl.
G03B 21/14     (2006.01)
G03B 21/22     (2006.01)
F16D 3/00      (2006.01)

(52) U.S. Cl. ............. 353/119; 353/122; 464/142; 248/292.14; 248/297.21; 248/593; 248/595; 211/171; 108/157.18

(58) Field of Classification Search ........... 353/119, 353/122; 464/141, 142; 248/292.14, 297.21, 248/593, 595, 155.2; 211/100, 171; 108/157.18
See application file for complete search history.

(56) References Cited

U.S. PATENT DOCUMENTS 1,782,175 A * 11/1930 Pearmain .................. 40/561
5,416,541 A * 5/1995 Fog ......................... 353/119
5,696,673 A * 12/1997 Pryor ........................ 700/66
D415,768 S * 10/1999 Howell ..................... D14/451
6,402,109 B1 * 6/2002 Dittmer .................. 248/284.1
6,604,722 B1 * 8/2003 Tan ....................... 248/276.1
D540,154 S * 4/2007 Bremmon .................. D8/363

* cited by examiner

Primary Examiner—Diane I. Lee
Assistant Examiner—Magda Cruz
(74) Attorney, Agent, or Firm—Grady K. Bergen; Griggs Bergen LLP

(57) ABSTRACT

A support system for the mounting/suspension/elevation of a commercial projector is disclosed. The projector support grasps the projector to be mounted at one of its surfaces (typically, the bottom surface) through the use of two support arms. The support arms are affixed to the projector surface though mounting screws or other equivalent fastening mechanisms. The support arms each feature an adjustment slot which runs substantially the entire length of the arms. The presence of the two slotted arms allows for a countless array of scissoring arrangements for the support arms. This allows for interconnection with/mounting of the vast majority of commercial projectors (which invariably feature differing constellations of mounting holes). The projector support also employs a primary mount to facilitate swiveling/positioning of the projector so that the unit is effectually oriented for projection.

20 Claims, 9 Drawing Sheets

PROJECTION EQUIPMENT SUPPORT SYSTEM

BACKGROUND OF THE INVENTION

Field of the Invention

This invention is directed towards the mounting systems designed to support projection equipment.

Buyer's Remorse: Recognizing the Need for a Support System After the Purchase of a Projector.

Many purchasers of modern projector systems discover only after removing the projector from its packaging, and placing it in the company conference room, that an effective mounting system for the projector is desperately needed (time is usually short) and not at hand.

Although FIG. 1 depicts a novel projection equipment support system, the details of which will be reviewed shortly hereinbelow, the reader is directed instead initially to FIG. 2A, 2B, 2C, 2D, and 2E. These figures have been included herein for the specific purpose of dramatizing the very real and vexing nature of the problem to which this invention is directed.

FIG. 2A depicts a perspective view of a typical unit of projection equipment 200 (or, projector 200). The projector 200 is shown in an upside-down state which is the orientation in which most such projectors are mounted when suspended from the company's conference room ceiling. Ceiling suspension of projectors 200 is desired because it frees up conference table space for working papers, telephone equipment, and other office paraphernalia. It also tends to minimize accidental blockage of the projection image when the projector 200 is in use.

The bottom surface 202 of the projector 200 is also shown.

Notice the presence of the three mounting holes 204a, 204b, 204c in FIG. 2A. These mounting holes 204a, 204b, 204c also appear in FIGS. 2B, 2C, and 2D; however, their location is entirely different. Notice, as well, that, in FIG. 2E, a fourth mounting hole 204d makes its appearance in that commercially available variant of projector 200.

If each of these projectors included a customized mounting system to facilitate its suspension from the ceiling, the buyer's task would be a simple one (i.e., following the installation instructions for the mounting system and suspending the projector). However, all too often, projectors are designed, manufactured and sold with the implicit assumption that their surface 202 will face the floor (the only consideration to the contrary being the existence of the mounting holes 204), and the poor buyer is therefore left to his own devices to locate a mounting system to stably, reliably, and cost-effectively suspend his newly purchased projector (on short notice).

Unfortunately, the projector accessories aftermarket isn't terribly helpful either. Trying to locate a mounting system that will "fit" the fixed arrangement of mounting holes 204 can be extremely frustrating and, worse, time-consuming. Frequently, a user will locate, purchase, and attempt to install a mounting system only to discover that the a mounting system cannot mate with the constellation of mounting holes 204 at hand.

In fact, even if the user was careful in his shopping, and he identified a mounting system that appeared to have support structures of the correct linear dimensions, he discovers another problem. The surface 202 of many projectors 200 feature surface irregularities 206 that vary widely. That is, for example, the bottom surface 202 of the projector 200 appearing in FIG. 2A features a bulged surface 206 owing to some of the projector 200's internal components and circuitry. This irregular surface 206 can easily confound numerous mounts designed with a flat undersurface 202 in mind, and, once again, the contours of surface 202 vary from projector to projector (compare, for example, FIG. 2A with FIG. 2C).

What is needed is a projection equipment support system that: (a) adapts to a wide variety of mounting hole constellations and projector surface topologies; (b) provides a stable source of support; and (c) is easy to use. It is to this long-felt need that the instant invention is directed.

BRIEF SUMMARY OF THE INVENTION

This patent application relates to a novel support system for the mounting a commercial projector.

The projector support disclosed herein grasps the projector to be mounted at one of its surfaces (typically, the bottom surface) through the use of two support arms. The design/arrangement of these support arms is critical as numerous prior art attempts to come up with a general purpose solution to the projector mounting problem have failed.

The support arms are affixed to the projector surface through mounting screws or other equivalent fastening mechanisms. Importantly, the support arms each feature an adjustment slot which runs substantially the entire length of the arms.

The presence of the two slotted arms allows for a countless array of scissoring arrangements for the support arms. This is critical because it allows for interconnection with/mounting of the vast majority of commercial projectors (which invariably feature differing constellations of mounting holes).

The projector support also employs a primary mount to facilitate swiveling/positioning of the projector so that the unit is effectually oriented for projection.

Figure 1:
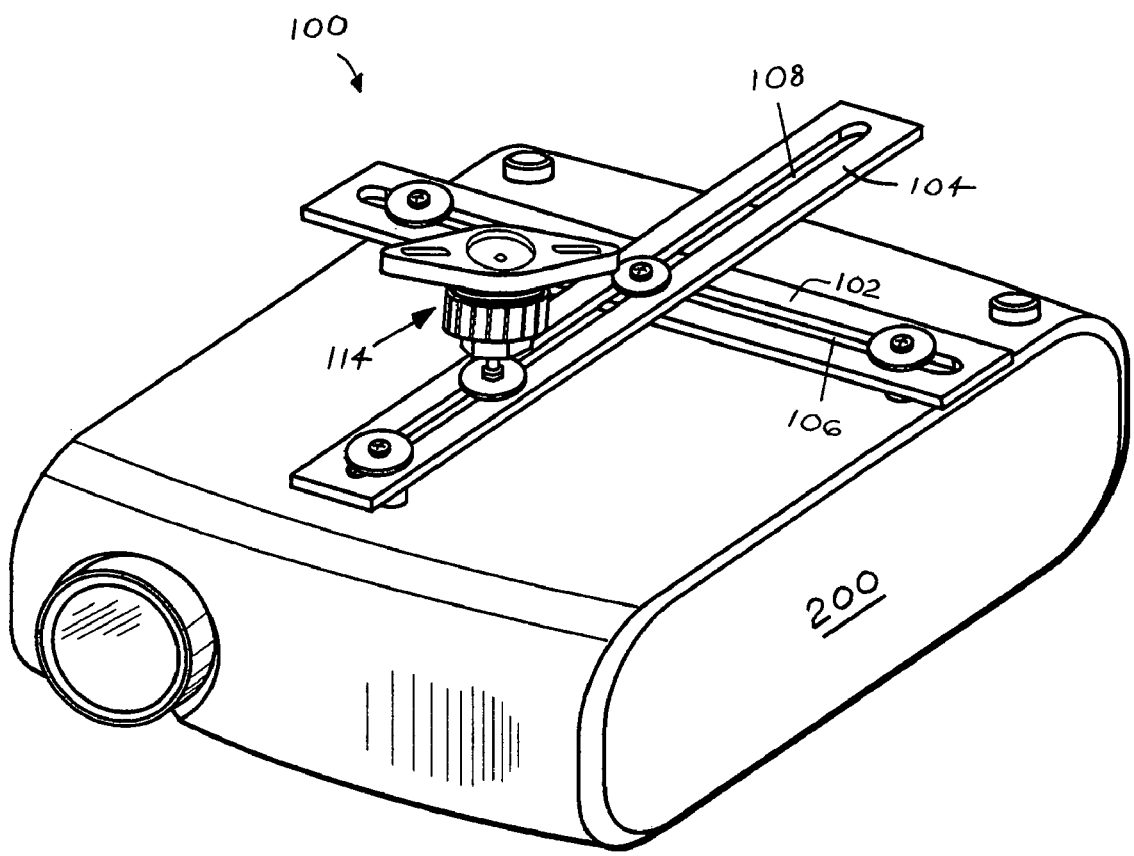
FIG. 1 presents a perspective view of the invention 100.
Figure 2A:
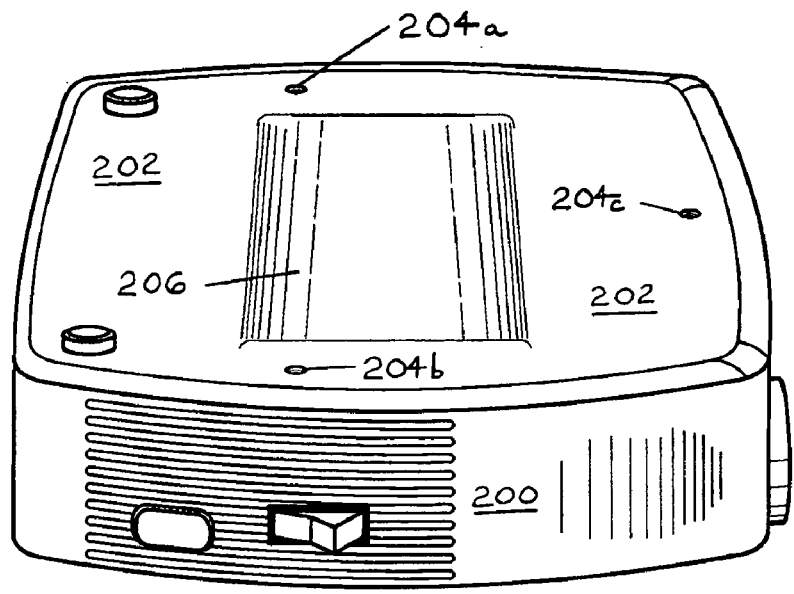
FIG. 2A presents a perspective view of a projector 200 illustrating that projector's unique arrangement of mounting holes 204 and surface irregularities 206.
Figure 2B:
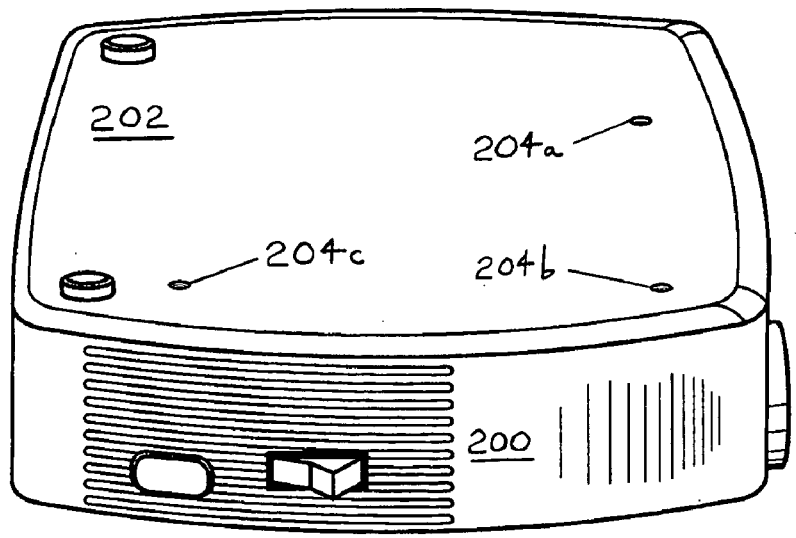
FIG. 2B presents a perspective view of a projector 200 illustrating that projector's unique arrangement of mounting holes 204.
Figure 2C:
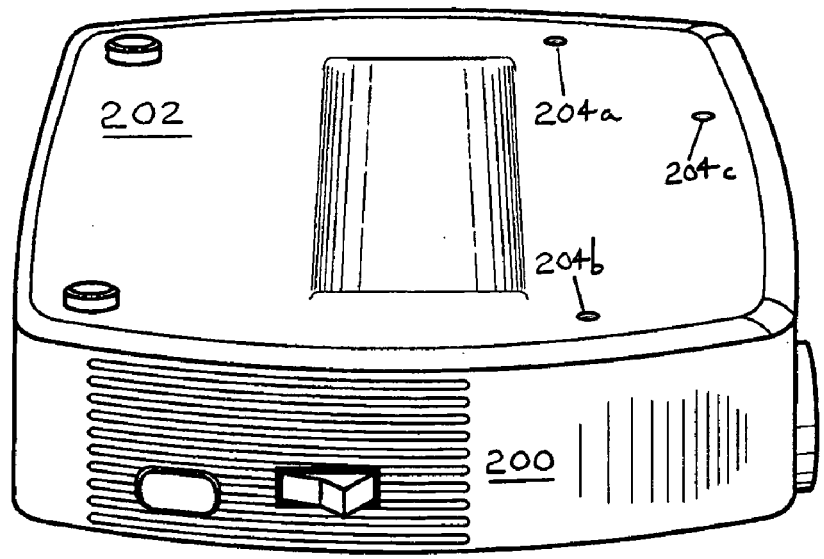
FIG. 2C presents a perspective view of a projector 200 illustrating that projector's unique arrangement of mounting holes 204 and surface irregularities 206.
Figure 2D:
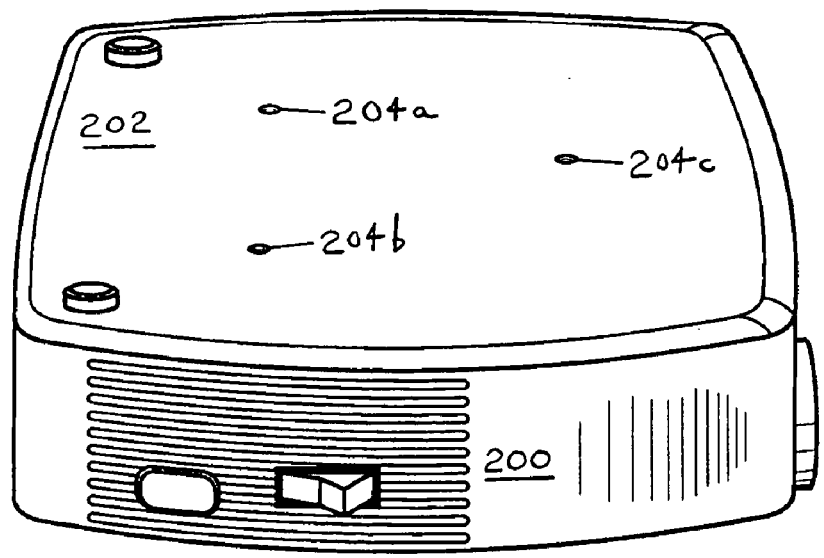
FIG. 2D presents a perspective view of a projector 200 illustrating that projector's unique arrangement of mounting holes 204.
Figure 2E:
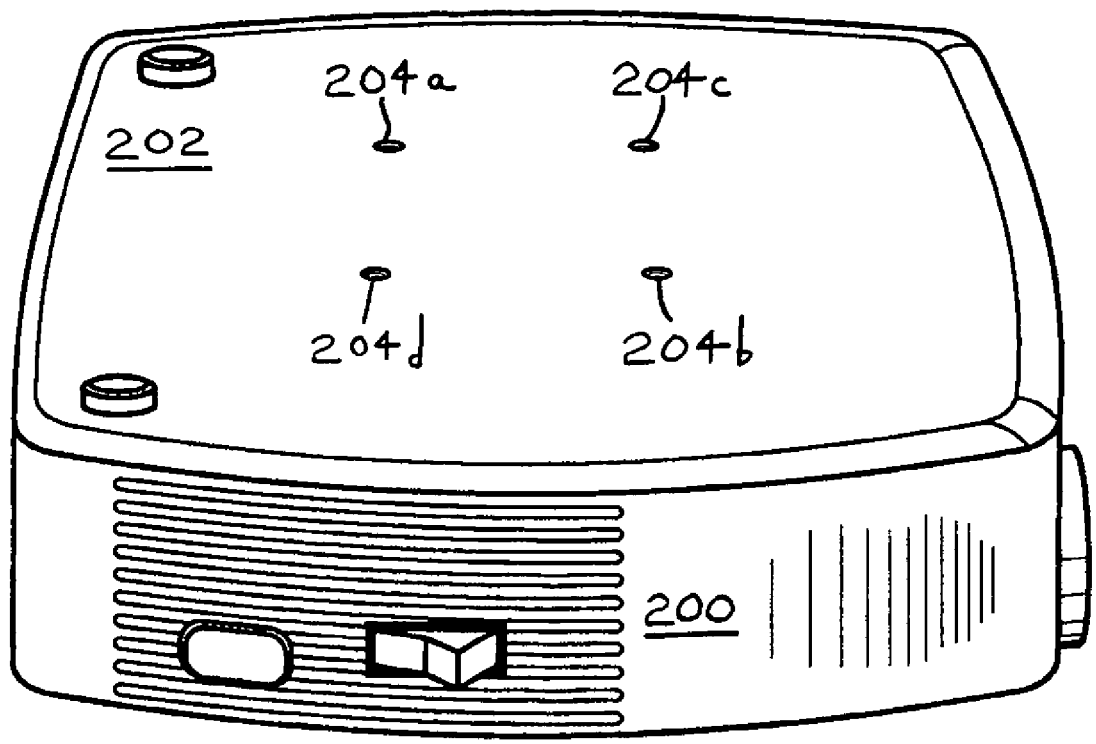
FIG. 2E presents a perspective view of a projector 200 illustrating that projector's unique arrangement of mounting holes 204.

This second sample installation of the invention 100 responds to the mounting hole placement constellation presented in FIG. 2B.

Figure 3A:
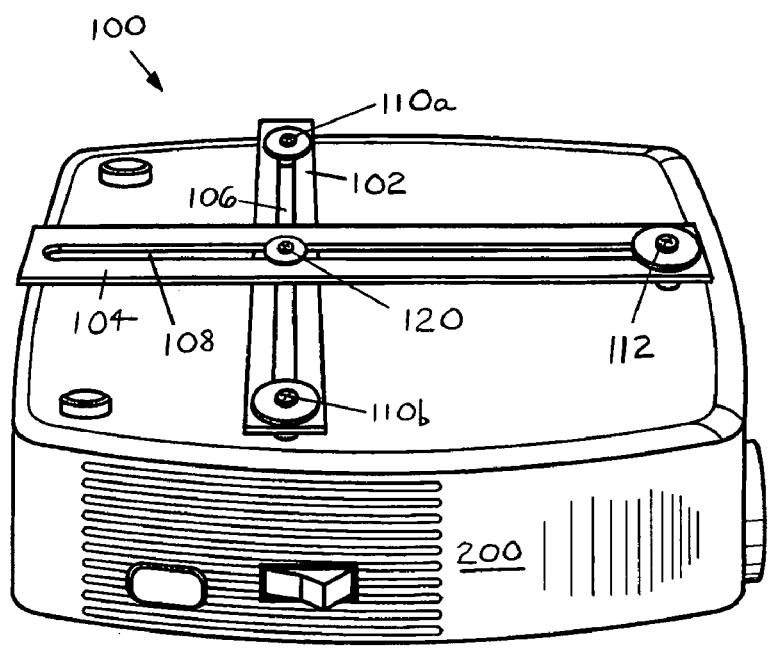
FIG. 3A presents a perspective view of a portion of the invention 100 showing the placement of the mounting screws vis-à-vis the mounting holes. This first sample installation of the invention 100 responds to the mounting hole placement constellation presented in FIG. 2A.
Figure 3B:
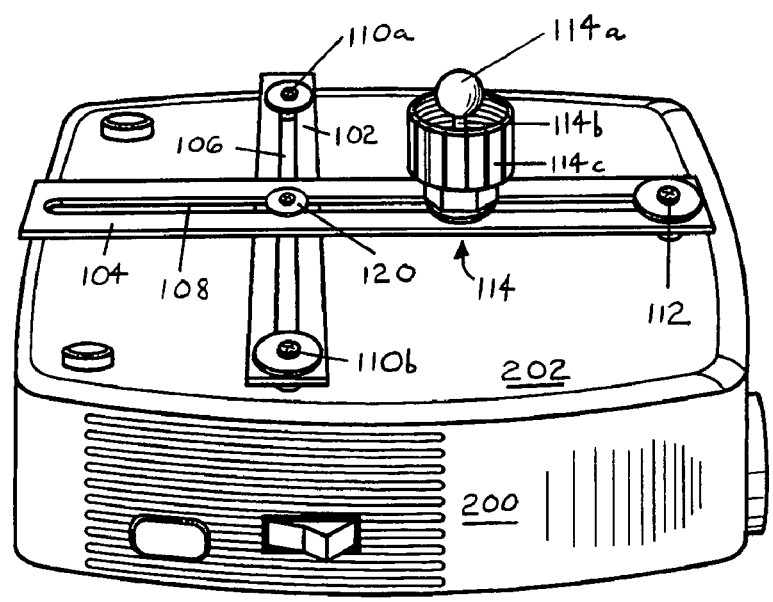
FIG. 3B presents a perspective view of a portion of the invention 100 showing the placement of the primary mount in a partially assembled state.
Figure 3C:
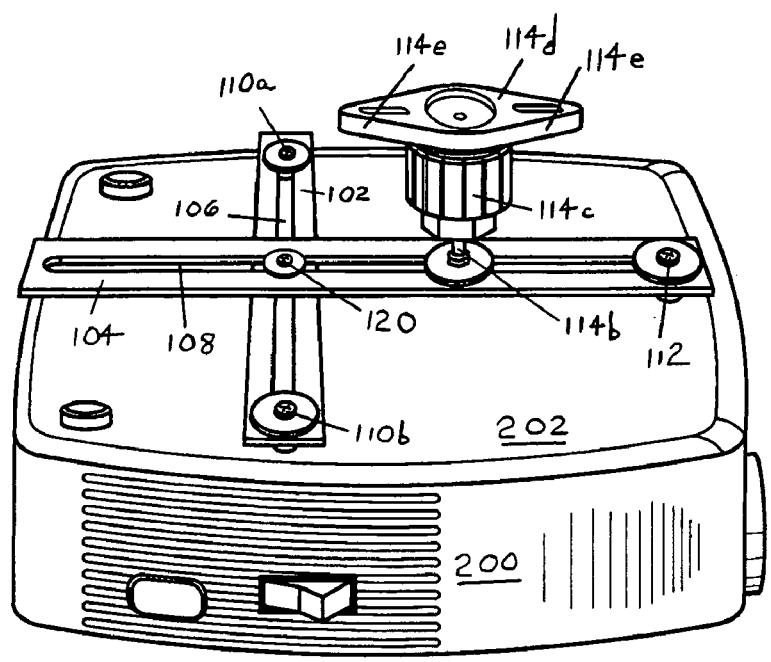
FIG. 3C presents a perspective view of the fully assembled invention 100 showing the placement of the primary mount.
Figure 3D:
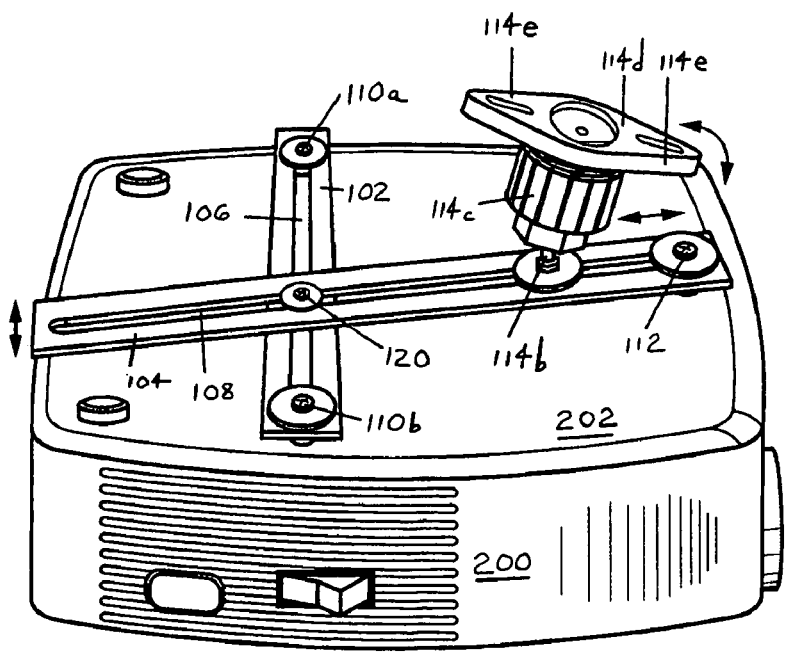
FIG. 3D presents a perspective view of the invention 100 and depicts the positional adjustments that the invention 100 makes possible.
Figure 3E:
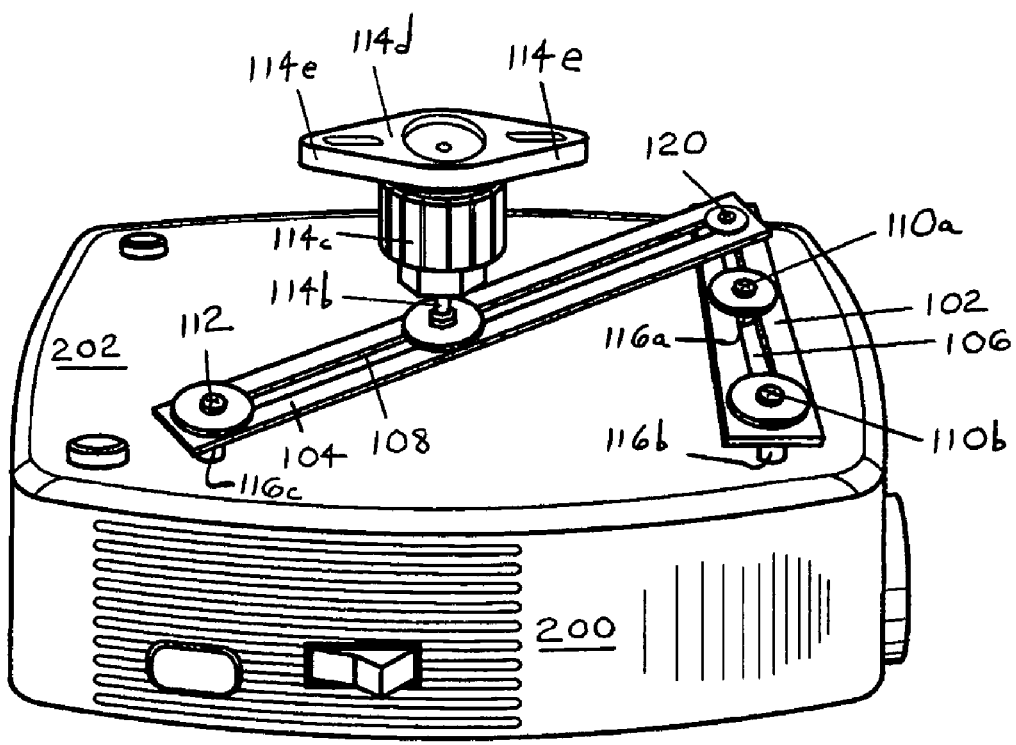
FIG. 3E presents a perspective view of the invention 100.
Figure 3F:
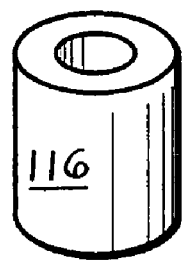

FIG. 3F presents a perspective view of the spacers 116 used in the invention 100.

Figure 4A:
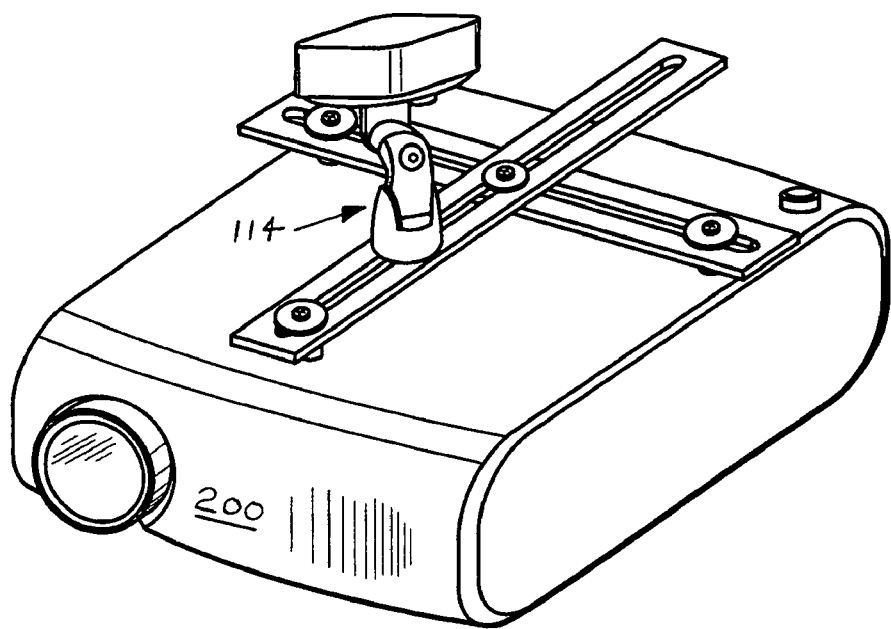

FIG. 4A presents a perspective view of an alternative primary mount 114 (namely, a dual-hinged mount).

Figure 4B:
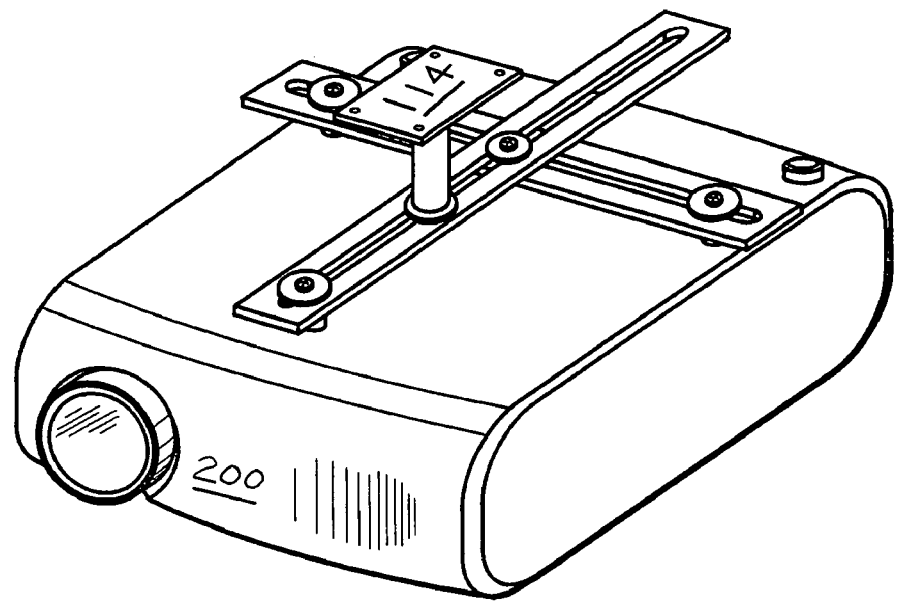

FIG. 4B presents a perspective view of an alternative primary mount 114 (namely, a fixed mount).

Figure 4C:
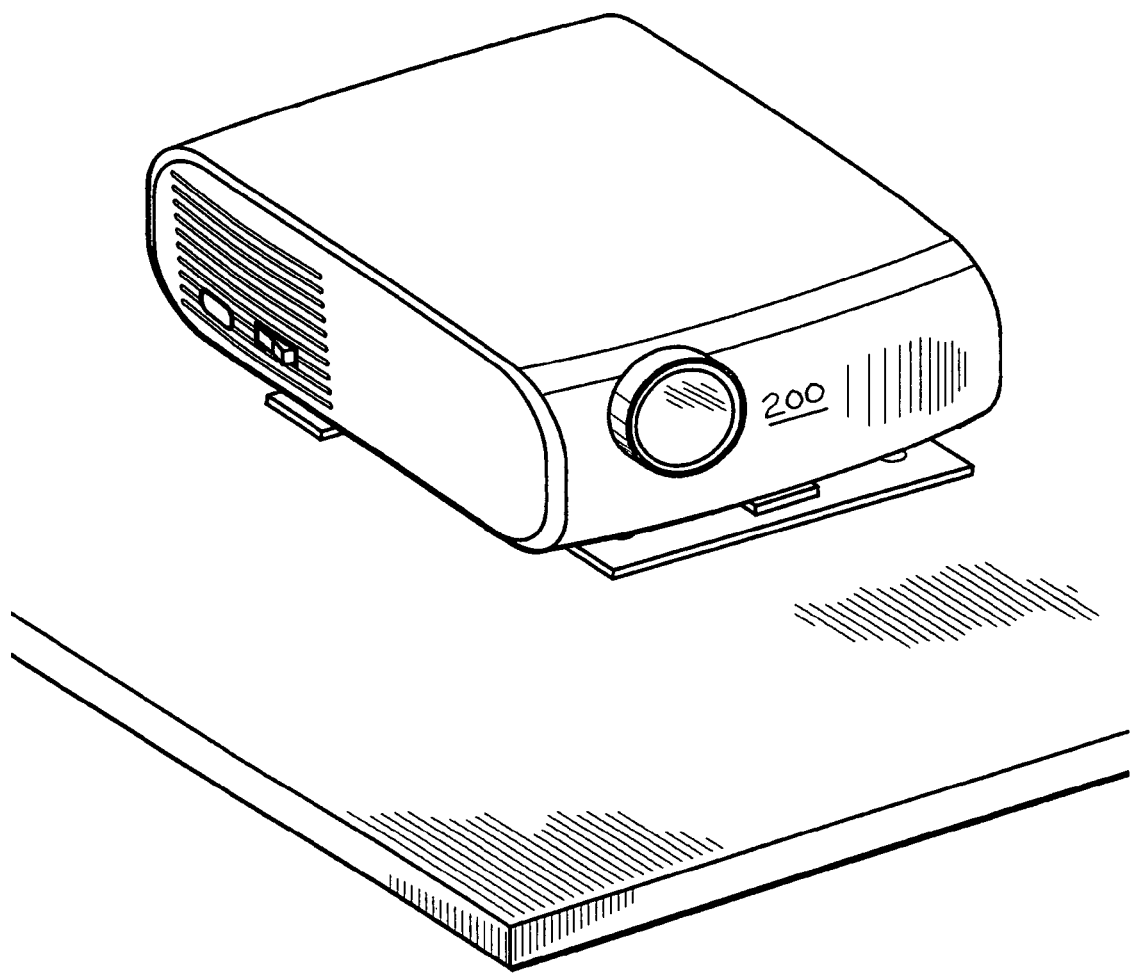

FIG. 4C presents a perspective view of the invention 100 as used to elevate a projector 200 from above the surface of a conference room table (rather than to suspend a projector 200 from the surface of a ceiling).

DETAILED DESCRIPTION OF THE PREFERRED EMBODIMENT

Turning, now, to the drawings, in which the use of similar reference characters denotes similar elements across the figures, FIG. 3A presents a perspective view of a portion of the invention 100; specifically, it and FIGS. 3B, 3C, and 3D which follow present a view of a sample installation of the invention 100. A second sample installation of the projector support is shown in FIG. 3E.

Returning to FIG. 3A, the projection equipment support system 100 is designed to support the projector 200 through inter-connection with the surface 202 of the projector 200. When the invention 100 (or "projector support 100") is properly installed and configured, the projector 200 will be maintained at an effectual orientation (relative to a support structure such as the ceiling (the usual case), a wall, or a conference table, podium, or floor) for projection of an image.

Mounting holes 204 are a characteristic of surface 202 of projector 200, and their presence was emphasized in the discussion of FIGS. 2A, 2B, 2C, 2D, and 2E. These holes 204 are hidden from view in FIGS. 3A, 3B, 3C, 3D, and 3E by the invention 100. However, the mounting holes 204 present in FIGS. 3A, 3B, 3C, and 3D are the ones depicted in FIG. 2A. The mounting holes 204 present in FIG. 3E are the ones present in FIG. 2B.

Although the invention is defined with reference to all of its elements and their inter-relationships with one another, there are still two important things to notice ab initio about the nature of the projector support 100 disclosed herein. First of all, notice that the projector support 100 features two support arms 102, 104. Many mount designs envision the use of several support arms with all of the attendant complexity and cost that such a design methodology entails.

Second, notice that each of the support arms 102, 104 features an adjustment slot portion 106, 108. And notice, in particular, the elongate dimension of the adjustment slot portions 106, 108. The elongate dimensions are such that they run the substantial length of the support arms 102, 104. These long adjustment slot portions 106, 108 make it possible to configure the projector support 100 into innumerable shapes, responsive to the vast majority of mounting hole 204 constellations.

It should also be noted that, while a single elongated adjustment slot (as shown in the drawings in this application) is doubtless the preferred embodiment of the adjustment slot portion 106, 108, the adjustment slot portion 106, 108 could also be configured as a series of smaller slot segments, a series of holes, or even a combination of the two. Because the adjustment slot portion 106, 108 essentially acts as a generic fastener support portion, it is even conceivable to utilize clamp-fitted fasteners slidably positionable along the fastener support portion to effectuate the intent of the invention 100. None of these variants would substantially impair the functionality of the projector support 100.

As shown in FIG. 3A, the first support arm 102 is affixed to the surface 202 through the use of mounting screws 110a, 110b. Each of the mounting screws 110a, 110b (or their functional equivalents) are positioned within the adjustment slot portion 106 of the first support arm 102 and engaged to a corresponding mounting hole 204a, 204b so as to affix the first support arm 102 to the surface 202.

The second support arm 104 is affixed in a slightly different manner. First, second support arm 104 is affixed to the surface 202 by means of mounting screw 112 which is similarly positioned within the adjustment slot portion 108 of second support arm 104. The mounting screw 112 engages its corresponding mounting hole 204c on the surface 202 of projector 200. The second support arm 104 is also affixed to projector 200 somewhat indirectly by means of a fastener 120 which is positioned within both of the adjustment slot portions 106, 108 of the support arms 102, 104. This fastener 120 is shown as being of the screw-and-nut variety; its primary purpose, as its name suggests, is to secure the first support arm 102 to the second support arm 104.

It should be noted that, although, in FIG. 3A, the second support arm 104 is affixed to both the surface 202 and the first support arm 102, it could instead be fastened directly to the surface 202 in precisely the same manner as first support arm 102. That is, the second support arm 104 could be affixed to the surface 202 through the use of a plurality of mounting screws 112, each of which would be positioned within the adjustment slot portion 108 of the second support arm 104 and engaged to a corresponding mounting hole 204 so as to affix the second support arm 104 to the surface 202. In such an embodiment, a fastener linking the support arms 102, 104 such as fastener 120 would be somewhat optional in character.

In fact, if mounting holes 204 allowed for the creation of an angle between the support arms 102, 104 that is obtuse enough to effectually distribute the weight of the projector 200, it is even believed to be possible to secure the projector 200 using only a single mounting screw 110, 112 for each support arm 102, 104. However, given the low cost of these fasteners, and the tremendous incremental stability imparted through the use of additional inter-connective members, it is generally recommended to employ one of the preferred embodiments described hereinabove.

Turning, now, to FIG. 3B, an additional element of the projector support 100 is revealed: the primary mount 114. The primary mount 114 is the link between the projector 200 (as fitted with the support arms 102, 104) and the support structure 300 (not shown in many of the figures) which will usually be the ceiling, a wall, or a table.

A preferred embodiment of the primary mount 114 is a ball mount 114 as shown in FIGS. 3A, 3B, 3C, 3D, and 3E. The designs of a broad array of ball mounts 114 are well known to those of ordinary skill in the art; however, a short review of the design and operation of a simple ball mount 114 ensures that the reader appreciates its operative contribution to the projector support 100.

In a nutshell, the ball mount assembly 114 features five components. First of all, there is the ball 114a itself which is most clearly visible in FIG. 3B. Note that the ball is fixedly attached to a ball mount shaft 114b. In FIGS. 3B, 3C, 3D, and 3E, the ball mount shaft 114b is fixedly attached at its lower end to the second support arm 104 through a screw-and-nut—type fastener. If the other components of the ball mount assembly 114 didn't block the reader's view, the ball mount shaft 114b would be apparent as a fixed structure rising perpendicularly from the second support arm 104 so as to elevate and support the fixed ball 114a.

The ball mount cup 114c is, as its name implies, a cup-shaped structure with a wide-diameter hole (not shown) centered in the bottom of the cup 114c to allow for broad movement of the cup 114c about the shaft 114b; however, the hole features a diameter which is smaller than that of the ball 114a so that the ball 114a cannot escape the cup 114c through the hole, and, in fact, the hole's edge is contoured so as to receive the ball 114a into a spherical recess. Notice that, in the absence of the ball mount clamp 114d (described below), the ball mount cup 114c could rotate quite freely about the ball mount shaft 114b.

The ball mount clamp 114d is essentially a solid cylinder with a spherical recess. Its outer surface features threads which interlace with threads on the inner surface of the ball mount cup 114c. As the clamp is rotated, the clamp's recess tightens down on the ball 114a so that, when the clamp is rotated to its maximum, the ball 114a is tightly clamped between the two recess portions of the assembly.

Notice that, in FIG. 3C, the cup-and-clamp assembly has been tightened into place in such a position that the clamp mounting members 114e are essentially perpendicular to the surface 202, while, in FIG. 3D, the clamp mounting members 114e are at an angle to the surface 202. This ability to configure and secure an angled orientation between ball mount shaft 114b and ball mount clamp mounting members 114e is what imparts the ball mount 114 its utility both in general and to this invention.

It should also be noted that many ball mount designs 114 allow the designer to impart variable resistance to the primary mount 114. This is usually done in part through the judicious selection of materials so as to manage the relevant coefficients of friction. In such a design, the user could gently impart a swiveling force to the projector 200, and it would indeed swivel to a new location; however, once it reached a new location, it would tend to maintain that position until a similar, sufficient swiveling force motivated change to a new static position.

In addition, although a preferred embodiment of the primary mount 114 is a ball mount (as shown in FIGS. 3B, 3C, 3D, and 3E), other mounts which impart similar/equivalent functionality may of course be employed. For example, FIG. 4A depicts an embodiment of the invention in which primary mount 114 is a dual-hinge—type mount which imparts functionality similar to that of the ball mount 114 in FIG. 3C. FIG. 4B, by contrast, features a primary mount 114 which is fixed in its orientation.

FIG. 3D demonstrates graphically one of the primary benefits of employing projector support embodying the principles of the invention 100: its versatility. The figure makes readily apparent how the support arms 102, 104 can be scissored into a myriad number of positions, based upon the application at hand. Furthermore, as discussed above, the ball mount 114 can be swiveled about the full range of motion made possible by the ball; in addition, the primary mount 114 can be slidably re-positioned to any one of the countless locations along the support arm 104 so as to centralize the support function (i.e., distribute the weight of the projector so as to manage stresses imparted to the projector support 100 and to facilitate pointing the projector 200 in the desired direction).

It should be noted that, although the embodiments shown herein depict a primary mount 114 mounted to the second support arm 104, those of ordinary skill in the art will doubtless appreciate that the invention 100 will operate equally well with the primary mount 114 secured to the first support arm 102.

Turning, now, to FIG. 3E, a perspective view of a second sample installation of the invention 100 is presented. This depiction of the projector support 100 responds to the mounting hole placement constellation presented in FIG. 2B.

Notice that, although the mounting hole 204 placement in FIG. 2B, 3E is radically different from the mounting hole placement shown in FIG. 2A, 3A, the projector support 100 solves the problem of effectuating a stable, solid mounting/support structure with ease.

Notice, in FIG. 3E, the presence of spacers 116a, 116b, 116c. These spacers are most useful when surface irregularities 206 are a problem (recall the examples presented in FIGS. 2A, 2C). In such cases, spacers 116 can be installed to separate a portion of the projector support 100 from the projector 200 (so as to get around or clear any surface irregularities 206). These spacers 116 are simply positioned on the mounting screws 110, 112. Frequently, a single spacer 116 will be employed for each mounting screw 110, 112; however, irregular insertions of spacers may also be employed in response to substantial surface irregularities 206.

Turning, now, to FIG. 3F, one observes the typical perspective appearance of one of the spacers 116. Although the projector 200 is rarely moved once installed, it is certainly moved about during installation, during maintenance, and during office moves. Because of this, and because of the fact that most projectors 200 are of nontrivial weight, effective spacers 116 will commonly feature a wall thickness of no less than about one-third of the outer spacer diameter.

Turning, now, to FIG. 4A, a perspective view of an alternative primary mount 114, namely, a dual-hinged mount, is presented. This mount, while operating according to physical principles which differ greatly from those at work in the ball mount shown in FIG. 3C, effectuates similar/equivalent functionality.

FIG. 4B presents a perspective view of an alternative primary mount 114, namely, a fixed mount. Use of such a fixed mount 114 might well be desirable in situations in which the desired orientation of the projector 200 to the support structure 300 is both known and also known to be unlikely to change.

FIG. 4C presents a perspective view of the invention 100 as used to elevate a projector 200 from above the surface of a conference room table (rather than to suspend a projector 200 from the surface of a ceiling).

Although the invention has been described with reference to a preferred embodiment, this description should not be construed in a limiting sense. Rather, various improvements, modifications, and additions to the disclosed embodiment, which do not depart from the spirit and scope of the present invention, will become apparent to persons of ordinary skill in the art, and these improvements, modifications and additions, and their equivalents, are to be viewed as being within the ambit of the claimed invention as defined below.

I claim:

1. A projection equipment support system for supporting a unit of projection equipment at a surface of said unit, said projection equipment support system supporting said unit at an effectual orientation for projection relative to a support structure, said surface featuring a plurality of mounting holes, said projection equipment support system comprising:
(a) two support arms, each of said support arms comprising an adjustment slot portion, at least one of said adjustment slot portions extending along at least a portion of the length of its associated support arm, whereby (1) the first of said two support arms is affixed to said surface by means of a plurality of mounting screws, each of said mounting screws positioned within the adjustment slot portion of said first support arm, each of said mounting screws engaging a corresponding mounting hole on said surface, and (2) the second of said two support arms is affixed to said surface by means of a mounting screw positioned within the adjustment slot portion of said second support arm, said mounting screw engaging a corresponding mounting hole on said surface, said second of said two support arms also being affixed to said first support arm by means of a fastener positioned within the adjustment slot portion of at least one of said support arms; and (b) a primary mount affixed at one end to one of said two support arms by means of a fastener positioned at a centralizing location of said one support arm, so that, when said primary mount is affixed at the other end to said support structure, said unit is effectually oriented for projection.

2. The projection equipment support system of claim 1 wherein said primary mount is a ball mount.

3. The projection equipment support system of claim 2 wherein said ball mount provides variable-resistance mounting support.

4. The projection equipment support system of claim 1 wherein one or more of said mounting screws are fitted with corresponding spacers to separate a portion of said projection equipment support system from the surface of said unit of projection equipment.

5. The projection equipment support system of claim 1 wherein at least one of said at least one adjustment slot portions comprises a single slot running the substantial length of the support arm of which it is a part.

6. The projection equipment support system of claim 1 wherein at least one of said at least one adjustment slot portions comprises at least one of a hole, a series of holes, a slot segment, a series of slot segments or a combination of these.

7. The projection equipment support system of claim 1 wherein at least one of said at least one adjustment slot portions comprises a hole.

8. A projection equipment support system for supporting a unit of projection equipment at an interfacing surface of said unit, said projection equipment support system supporting said unit at an effectual orientation for projection relative to a support structure, said surface featuring a plurality of mounting holes, said projection equipment support system comprising:

(a) not more than two support arms, each of said support arms comprising an adjustment slot portion, at least one of said adjustment slot portions running the substantial length of its associated support arm, whereby (1) the first of said two support arms is affixed to said surface by means of a plurality of mounting screws, each of said mounting screws positioned within the adjustment slot portion of said first support arm, the adjustable slot portion of said first support arm allowing the mounting screws to be selectively positioned at different positions along the length of said first adjustment slot portion of said first support arm, each of said mounting screws engaging a corresponding mounting hole on said surface, and (2) the second of said two support arms is affixed to said surface by means of a plurality of mounting screws, each of said mounting screws positioned within the adjustment slot portion of said second support arm, the adjustment slot portion of said second support arm allowing the mounting screws to be selectively positioned at different positions along the length of said adjustment slot portion of said second support arm, each of said mounting screws engaging a corresponding mounting hole on said surface; and (b) a primary mount affixed at one end to one of said two support arms by means of a fastener positioned at a centralizing location of said one support arm, so that, when said primary mount is affixed at the other end to said support structure, said unit is effectually oriented for projection.

9. The projection equipment support system of claim 8 wherein said primary mount is a ball mount.

10. The projection equipment support system of claim 9 wherein said ball mount provides variable-resistance mounting support.

11. The projection equipment support system of claim 8 wherein one or more of said mounting screws are fitted with corresponding spacers to separate a portion of said projection equipment support system from the surface of said unit of projection equipment.

12. The projection equipment support system of claim 8 wherein at least one of said at least one adjustment slot portions comprises a single slot running the substantial length of the support arm of which it is a part.

13. The projection equipment support system of claim 8 wherein at least one of said at least one adjustment slot portions comprises at least one of a hole, a series of holes, a slot segment, a series of slot segments or a combination of these.

14. The projection equipment support system of claim 8 wherein at least one of said at least one adjustment slot portions comprises a hole.

15. A projection equipment support system for supporting a unit of projection equipment at an interfacing surface of said unit, said projection equipment support system supporting said unit at an effectual orientation for projection relative to a support structure, said surface featuring a plurality of fastener receiving portions, said projection equipment support system comprising:

(a) two support arms, each of said support arms comprising a fastener support portion, whereby (1) the first of said two support arms is affixed to said surface by means of one or more fasteners, at least one of said one or more fasteners engaged with the fastener support portion of said first support arm, the fastener support portion of said first support arm allowing the fasteners to be selectively positioned at different positions along the length of said first support arm, at least one of said one or more fasteners engaging a corresponding fastener receiving portion of said surface, and (2) the second of said two support arms is affixed to said surface by means of a one or more fasteners, at least one of said one or more fasteners engaged with the fastener support portion of said second support arm, the fastener support portion of said second support arm allowing the fasteners to be selectively positioned at different positions along the length of said second support arm, at least one of said one or more fasteners engaging a corresponding fastener receiving portion of said surface; and (b) a primary mount affixed at one end to one of said two support arms by means of a fastener positioned at a centralizing location of said one support arm, so that, when said primary mount is affixed at the other end to said support structure, said unit is effectually oriented for projection.

16. The projection equipment support system of claim 15 further comprising a fastener connecting said first support arm to said second support arm.

17. The projection equipment support system of claim 16 wherein said fastener connecting said first support arm to said second support arm further connects said two support arms to said unit of projection equipment.

18. The projection equipment support system of claim 15 wherein said primary mount is a ball mount.

19. The projection equipment support system of claim 18 wherein said ball mount provides variable-resistance mounting support.

20. The projection equipment support system of claim 15 wherein one or more of said fasteners are fitted with corresponding spacers to separate a portion of said projection equipment support system from the surface of said unit of projection equipment.

* * * * *